L. DREXLER.
DEVICE FOR PLANING THE RIMS OF CASKS.
APPLICATION FILED MAR. 28, 1908.
909,164.
Patented Jan. 12, 1909.
5 SHEETS—SHEET 1.
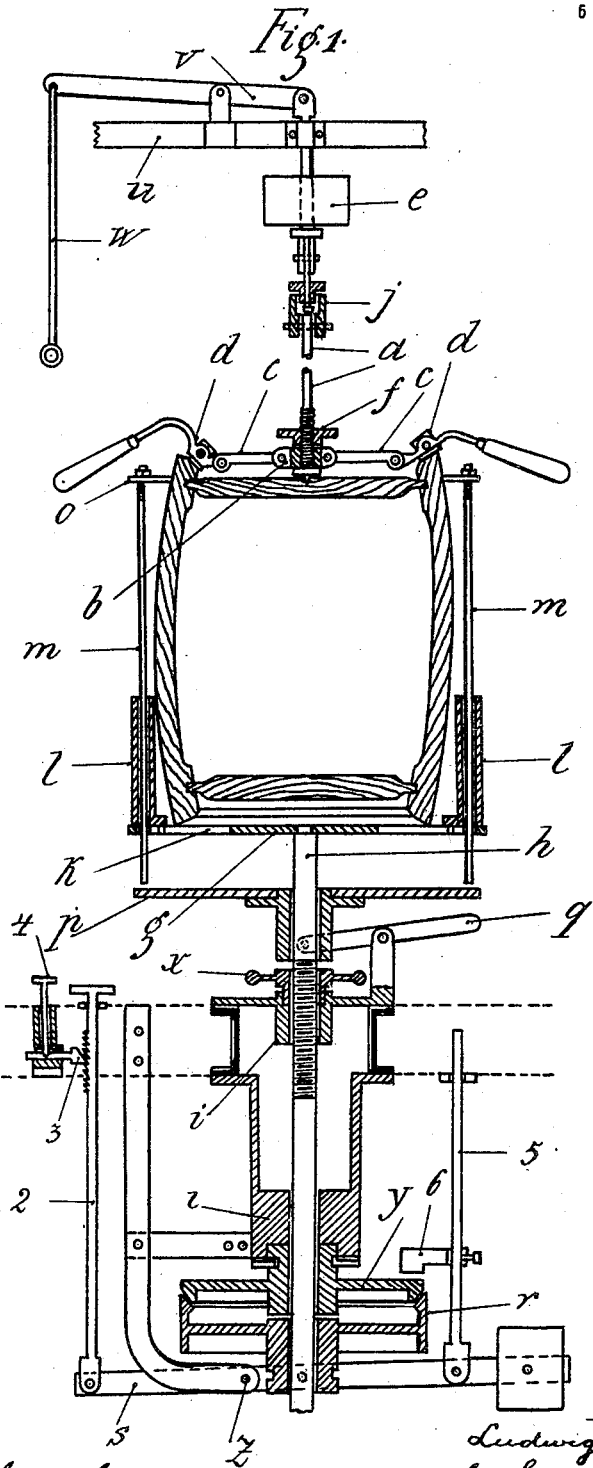
Witnesses:
E. O. Hildebrand
M. B. Taylor.
Inventor:
Ludwig Drexler
by Georgii + Massie
his Attorneys L. DREXLER.
DEVICE FOR PLANING THE RIMS OF CASKS.
APPLICATION FILED MAR. 28, 1908.
909,164.
Patented Jan. 12, 1909.
5 SHEETS—SHEET 2.
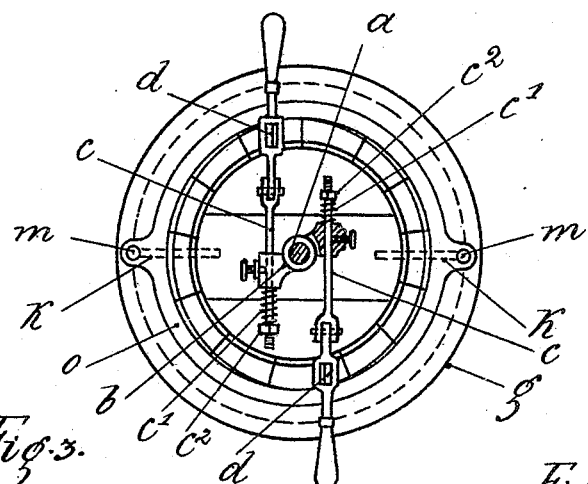
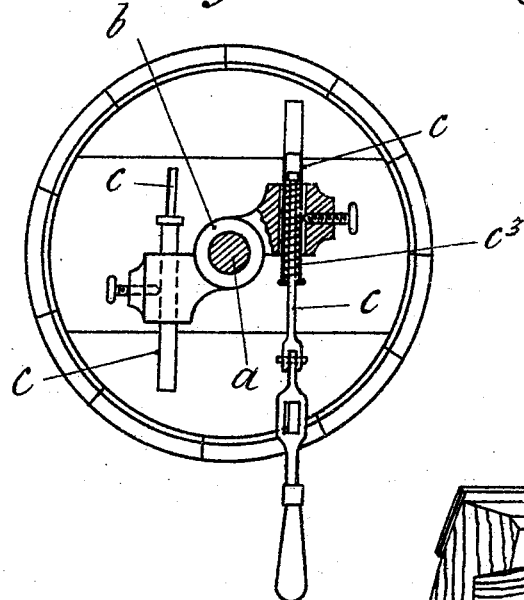
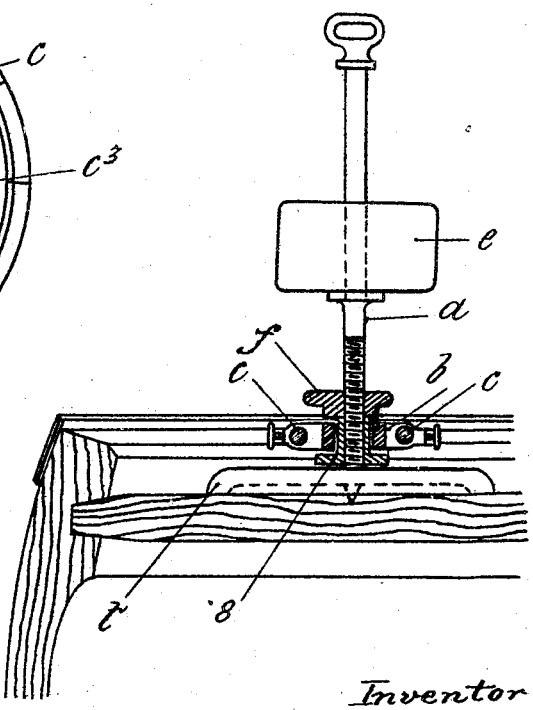
Witnesses:
E. O. Hildebrand
M. B. Taylor.
Inventor:
Ludwig Drexler
by Georgii & Massie
his attorneys.
THE NORRIS PETERS CO., WASHINGTON, D. C.

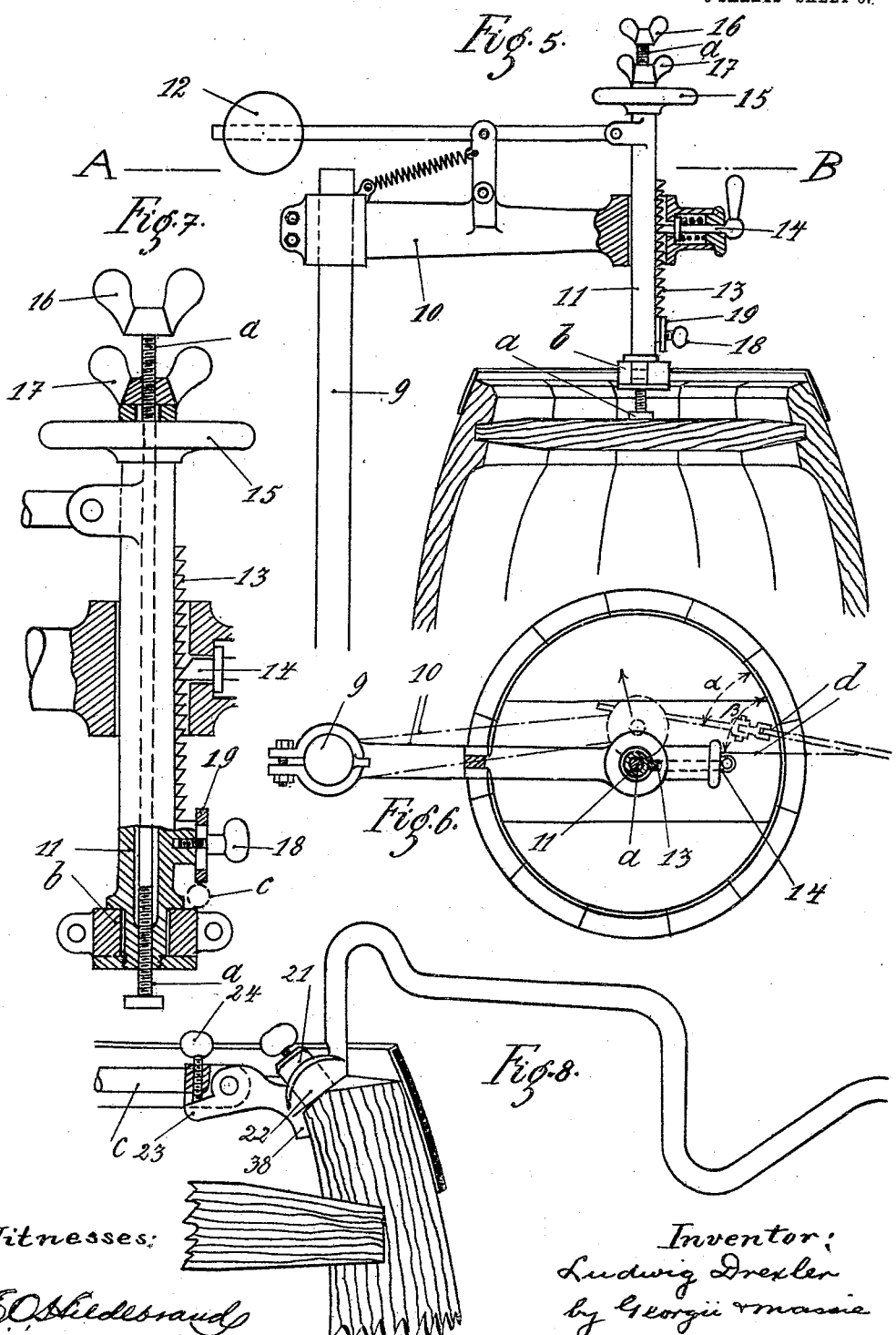

L. DREXLER.
DEVICE FOR PLANING THE RIMS OF CASKS.
APPLICATION FILED MAR. 28, 1908.
909,164.
Patented Jan. 12, 1909.
5 SHEETS—SHEET 4.
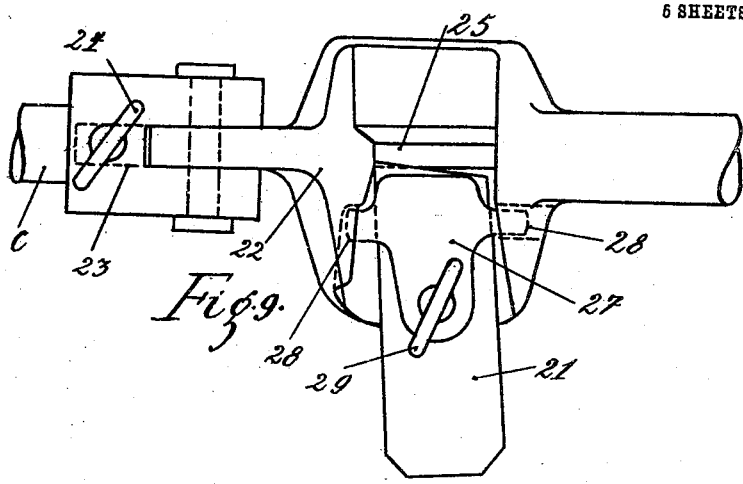
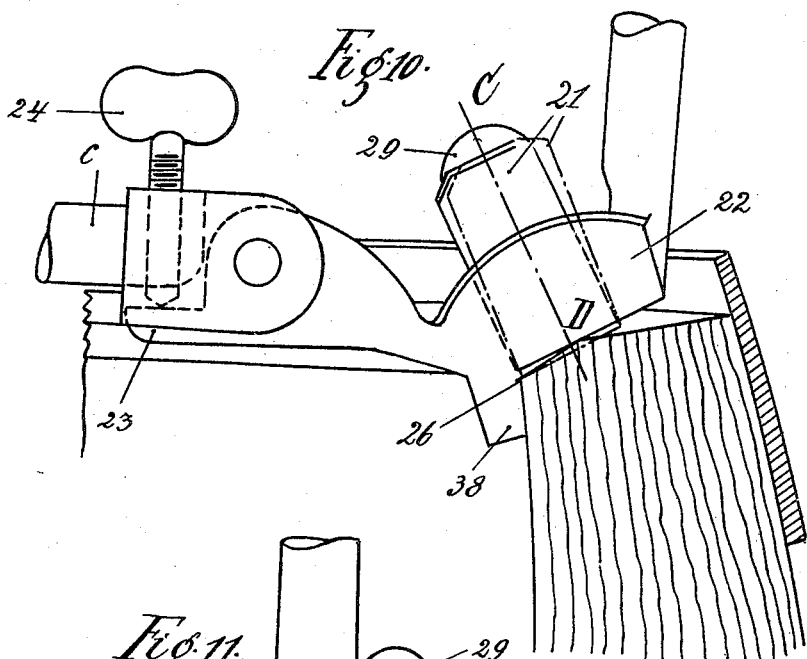
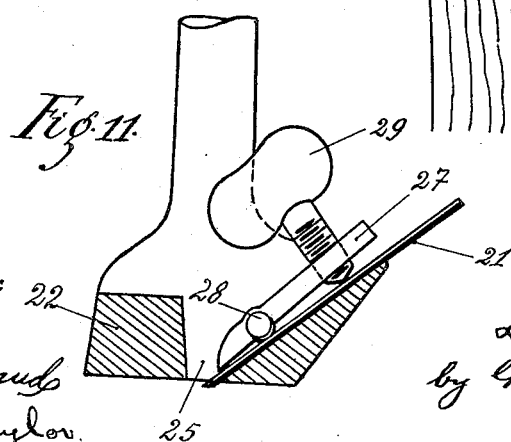
Witnesses:
E. O. Hiedebrand
M. B. Taylor
Inventor:
Ludwig Drexler
by Georgii & Massie,
his Attorneys.

L. DREXLER.
DEVICE FOR PLANING THE RIMS OF CASKS.
APPLICATION FILED MAR. 28, 1908.
909,164.
Patented Jan. 12, 1909.
5 SHEETS—SHEET 5.
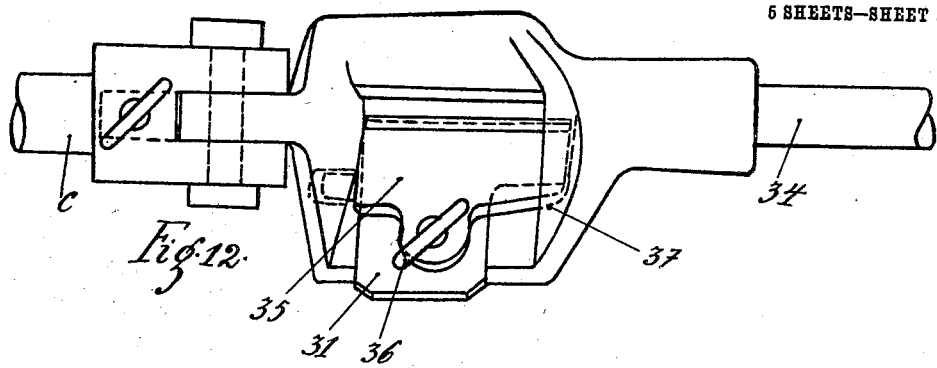
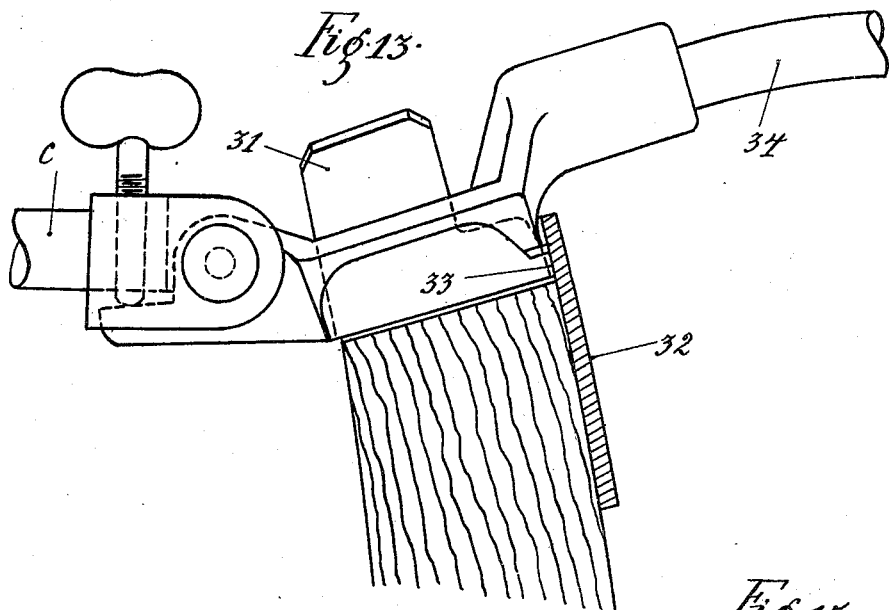
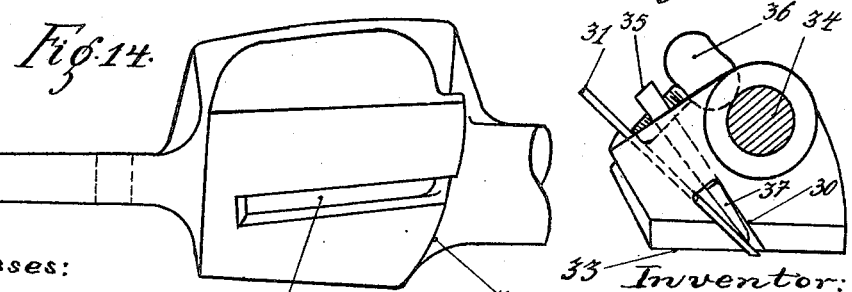
Witnesses:
E. O. Hildebrand
M. B. Taylor
Inventor:
Ludwig Drexler
by Georgii & Massie
his attorneys

UNITED STATES PATENT OFFICE.

LUDWIG DREXLER, OF MUNICH, GERMANY.

DEVICE FOR PLANING THE RIMS OF CASKS.

No. 909,164.  Specification of Letters Patent.  Patented Jan. 12, 1909.

Application filed March 28, 1908. Serial No. 423,340.

*To all whom it may concern:*

Be it known that I, LUDWIG DREXLER, citizen of Germany, residing at Munich, Bavaria, Germany, have invented certain new and useful Improvements in Devices for Planing the Rims of Casks; and I do hereby declare the following to be a full, clear, and exact description of the invention, such as will enable others skilled in the art to which it appertains to make and use the same.

After the head or bottom has been fitted into a cask and the hoops applied, it is necessary to plane off the upper rim of the cask. For doing this the well-known appliances, consisting of an arm pivoted on an axis which is suitably fixed in the interior of the cask, used for planing or smoothing this interior before fixing the bottom or head, cannot be used, since the rim projecting beyond the head or bottom is too short for securing such an appliance; and further, the tool of such an appliance describes a circle, while new casks generally receive a slightly oval form, this being to allow for the difference in the contraction of the wood used for the cask head or bottom in the two directions parallel and at right angles to the grain of the wood. Hitherto it has been usual to perform this work of planing off the cask rims either with the help of hand tools or by means of a motor-driven tool suspended above the edge of the cask and moved along said edge by hand.

The present invention relates to a machine for planing off these cask rims in a quick and convenient manner, and consists essentially of a tool which is held by suitable contrivances in the correct position for treating said cask rims, the cask itself being meanwhile rotated.

Also, an essential feature of the invention is the arrangement for counterbalancing the tool-support with its accessories, so that the workman, when changing the cask under treatment, need not lift said tool-support and accessories from the cask, this operation being performed automatically.

Reference being had to the accompanying drawings, the machine is shown without the above-mentioned counterbalancing arrangement in Figure 1 in a longitudinal section; Figs. 2 and 3 show two ways of arranging the knife-holders, in plan view; Fig. 4 shows another arrangement of the knife-holders and accessories, in a side view; Fig. 5 is a longitudinal section, showing the arrangement for counterbalancing the tool holder and tools; Fig. 6 a cross-section along the line A—B in Fig. 5, Fig. 7 is a longitudinal section showing details; and Figs. 8 to 15 show different forms and arrangements of the knives and knife-holders in detail.

In the drawing ($a$) is a spindle, pressed down by the weight ($e$), and carrying the tool holder ($b$) at its lower end, which latter is pointed. In this holder ($b$) the arms ($c$), to which the knives ($d$) are pivotally attached, are slidingly arranged. The holder ($b$) screws on a thread of the spindle ($a$) and can be adjusted at varying heights with the help of the jam-nut ($f$). This adjustability of the height of the holder is necessary in order to adjust the knives for different depths of the cask heads and also for the differing angles of the cask rim formed by the ends of the staves. The adjustment for different diameters is attained by sliding the arms ($c$) in the holder ($b$). This arrangement of the arms ($c$) sliding in the holder ($b$) also permits of the ready adjustment of the position of the knives to the oval form of the cask head during the operation of said knives. It is only necessary to pull the knives outwards by their handles; stops on the knives themselves or on the knife-holders hereupon abut against the cask rim or against the overlapping uppermost hoop in order to limit the outward movement of the knife.

It is advisable to provide the knife-arms ($c$) with springs or the like which tend to always draw the tool towards the center. The knife will then, when not in use, be automatically pulled back. These springs may, for instance, as shown in Fig. 2, consist of coil springs $c^1$ arranged on the arm $c$, pressing on one side against the holder ($b$) and on the other against a nut ($c^2$) or other suitable adjustable piece.

According to the form of construction shown in Fig. 3, the arm ($c$) consists of two parts sliding one within the other, the outer part being fixed in the holder ($b$) by means of a set screw. The coil spring ($c^3$) is so arranged that it always presses the inner part of the arm ($c$) away from the circumference of the cask.

The set screws on the holder ($b$) are only provided for fixing the arms ($c$) when not in operation. During the operation of the tool in question these arms must obviously be free to slide in the holder ($b$), in order to admit of the necessary adjustment to the slightly oval form of the cask, as already described.

The spindle (a) is guided, in the form of construction shown in Fig. 1, at its lower end by its center-point entering the cask-head, and at its upper end in a bearing of the support (u). On this support a lever (v) is mounted, to one end of which the spindle (a) is pivotally attached, while at the other end a rod or the like (w) is suspended by which the spindle together with all its accessories can be lifted away from the cask-head; if necessary, a suitable catch or the like may be provided to hold this rod (w) down.

The spindle a may, if desired, be jointed, as shown at j, and this construction will facilitate the removal of the apparatus from over the cask or permit the knives to be swung to one side out of the way while an untrimmed cask is being placed in position to be treated.

In the form of construction shown in Fig. 4, the spindle (a), is provided with a weight (e), and arranged on a base or foot-piece (t), which insures the correct vertical position of the spindle, without necessitating an upper bearing or support. Since in this case the spindle (a) rotates with the cask, the holder (b) cannot be screwed directly onto the spindle, as shown in Fig. 1, but is rotatably arranged on a collar (8), screwed on the spindle (a), and secured in its position by the jam-nut (f). By this arrangement the holder (b) is free to rotate on the spindle (a) but can at the same time be fixed at any desired height from the cask head.

The spindle (a) is provided at its upper end with a handle for lifting the entire device away from the cask.

Besides the two knives provided for the ends of the staves, a third knife may be also similarly arranged on the spindle (a) for planing off the inner surface of the rim of the cask.

During operation, those tools not required for the moment can be laid back, being pivoted to the arms (c), whereupon it is advisable to secure these latter with the help of the set screws.

The contrivance for supporting and centering the cask consists, in the form of construction illustrated in Fig. 1, of a table or plate (g), vertically adjustable, and carried by the spindle (h), which is about 6 feet long and rests in bearings (i, i). The guide-sleeves (l) for the centering ring (o), or simply bars (m, m) carrying claws, are adjustably arranged in grooves (k, k) of the table (g). For lifting and lowering the centering ring (o) or similar device, a plate (p) is arranged below the table (g), which plate (p) can be raised and lowered by means of a foot lever (q). This lever can be fixed in any desired position with the help of a suitable catch or similar device.

With the help of the centering ring (o) or suitable claws the cask can be secured in a central position. Obviously the ring (o) must always be chosen of a size to fit the cask in question.

The raising of the table (g) can be effected in any desired manner; in the form of construction under consideration a hand wheel (x), internally threaded to screw on the spindle (h), and resting on the upper bearing (i), has been provided for this purpose.

The rotation of the cask is attained by means of a pulley (r) which can be coupled to the spindle (h) with the help of a frictional coupling (y). A lever (s), pivoted in (z) and carrying at one end a weight and at the other end a rod (2) provided with teeth forming a rack at its upper extremity, is adapted to raise the pulley (r) when rod (2) is pressed down, thereby coupling the pulley (r) to the spindle (h). The catch (3) engaging with the teeth of the rod (2) secures the position of the pulley (r) when coupled; this catch (3) can be released by a foot-lever, pedal or the like (4). A stop (6), arranged on a rod (5), pivotally attached to the lever (s), is adapted to limit the downward movement of the pulley (r) and at the same time to act as a brake.

It must be mentioned that all operations in connection with this device can be performed by a single workman, who can manipulate the rod (w) (for lifting the spindle and tools from the cask head) with his left hand, while his right hand adjusts the holder (b) or manipulates the knife required for the work in question; his left foot attends to the pedals (2) and (4) and his right foot to the foot lever (q).

Figs. 5 and 7 show the arrangement for counterbalancing the tools. The holder (b) is in this case carried by an advisably hollow column (11), sliding vertically in an arm (10), which latter is adjustably arranged on a suitable support (9). The column (11) is pivoted to a double-armed lever carrying a counterweight (12), and is further provided with a rack (13), by means of which rack in connection with the spring catch (14) the column (11) can be held in position against the action of the counterweight (12). The manner of operation is as follows: The counterweight is so adjusted that it will automatically lift the column (11) with the tools as soon as the catch (14) is released. The whole work of the attendant when changing the cask now consists in releasing catch (14), whereupon the cask is free to be lifted away; after placing a new cask in position, the attendant simply pulls the column down again by the hand-wheel (15), the catch (14) and rack (13) then automatically locking the device in position. In order to fix the height of the holder (b) above the cask head, the spindle (a) is threaded to screw into the lower part of the hollow column (11) and possesses at its lower end a foot and at its upper end a fixed thumb screw (16). The screw-nut (17) serves to lock the spindle (a) in its position. As may be seen in Fig. 5 the foot of the spindle (a) has no point and can therefore in no way damage the cask head. A vertically adjustable plate (19), secured in position by screw (18), may also be provided on the column (11). For certain manipulations, as for instance, for planing the inner circumference of the cask rim and also for planing the upper beveled surface it is not absolutely necessary to connect the tools with the holder (b). As shown in Fig. 7 by the dotted circle, the arm (c) of the tool may simply be inserted between the holder (b) and this adjustable plate or piece (19); the latter then serves as a counter-rest for the tool when in operation. It must also be mentioned, that the adjustability of the arm (10) on its support (9) serves not only for the rough adjustment for different sizes of casks, but can also be used for bringing the whole device out of the center of the cask, into an eccentric relation which is, especially in the case of very large casks, often desirable in order to attain a more effective angle of the knife to the surface under treatment. In Fig. 6 such an eccentric adjustment of the column (11) is shown in dotted lines. In this case the angle $\alpha$ of the tool is more acute than the angle $\beta$ of the tool when the device is centrally adjusted. When planing off the upper surface of the cask rim, in order to afford a guide for the knife, it is advisable to let the top hoop of the cask slightly overlap, as shown in Fig. 5. Formerly it was necessary to remove this top hoop for the work in question. In consequence of this guide afforded to the tool by the hoop it is possible to turn the arm (10) so far to one side that the column (11) lies outside the circumference of the cask.

Figs. 8 to 15 illustrate forms of construction of two knives which are especially adapted for use with the device according to the present invention. The first of these knives is intended for planing off the facet of the beveled top edge of the cask; Fig. 8 shows a view of this knife with its handle, as seen from the side; Fig. 9 is a plan view, Fig. 10 an enlarged side view, and Fig. 11 a section along the line C—D of Fig. 10. For planing this facet of the beveled top edge of the cask two characteristics are required of the tool: In the first place, it must be adjustable for different angles of said facet, and secondly, it must be possible to plane off different widths of facet, that is to say, to execute facets in any desirable width. For the first purpose the holder (22) of the knife (21) (Figs. 9 and 10) is pivotally connected to the arm (c); a set screw (24) abutting against the stop (23) of the knife holder serving to adjust the angle of the tool, which adjustment can be effected during the operation of the knife. The same arrangement can also be applied to the knives used for the other necessary operations, a variable angle of the tool being in many cases very desirable.

For planing facets of different widths the following arrangement has been made: The knife holder (22) is provided with a stop or projection (38) (Fig. 10), which abuts against the inside of the cask rim during operation. The knife (21) adjoins this projection (38) at (26); and according to the angle at which the knife is adjusted, the latter will protrude more or less out of the aperture (25) of the holder (Fig. 11). The width of the facet can now be determined by the extent to which the knife edge protrudes out of the aperture (25); and as soon as the necessary width has been attained, the knife will leave off cutting.

In Fig. 10 the knife is shown in two positions. The position shown in dotted lines is for planing a facet of the full width of the knife itself, while the other position is for a facet of half the width of the knife. The enlargement or reduction of the cutting edge of the knife can also be attained in the case of a tool adjustable in a straight line, either by adjusting the knife itself at an angle in its holder or by arranging the cutting edge of the knife at a slant to the sides of the knife. The set screw (24) may also be used, if necessary, to correct the angle at which the knife is adjusted.

The contrivance for fixing the knife in position, shown in Figs. 9 and 11, allows of a wide adjustability of the knife for the purposes above described. A block (27), having pivots (28) resting loosely in a hole and slot respectively of the holder (22), presses, in conjunction with the set screw (29), against the knife and thus securely locks it in the desired position.

The contrivance shown in Figs. 12 to 15 is intended for planing the upper edge of the rim of the cask; and of these Fig. 12 is a plan view, Fig. 13 a side view, Fig. 14 a view from below, and Fig. 15 a front view. The manner of connection of the knife holder to the arm (c) is here the same as in the form of construction described above. In the present form, however, the knife aperture extends to the edge (33) of the holder, that is, the outside edge adjoining the overlapping hook (32). This permits the tool to plane the upper rim of the cask in its entire width. The eccentric adjustment, as described above, will cause the edge (33) of the holder to press tightly against the outer hoop (32), and the knife will therefore extend across the whole breadth of the upper edge of the cask rim, thus giving a perfectly clean cut. In this form of construction also a block (35) with set screw (36) is provided for fixing the knife in position. Since the aperture (30) is open on the one side, only one pivot is provided on the block (35), the other side of said block being extended so as to enter the aperture (30) on one side, (Fig. 15).

What I claim as my invention and desire to secure by Letters Patent, is:

1. In a cask rim planing machine, a rotatable cask support, a tool holder, a support for the tool holder alined centrally with the cask support, arms adjustable in the holder in a plane substantially parallel to that of the rim, tools carried by the arms in operative relation to the rim, and means to adjust the tool holder axially of the barrel.

2. In the cask rim planing machine, a rotatable cask support, a tool holder, arms adjustable in the tool holder in a plane substantially parallel to that of the rim, yielding means pressing the arms inwardly from the rim, tools pivoted to the arms to swing in a vertical plane, and means to support the tool holder at varying heights above the cask end.

3. In a cask rim planing machine, a rotatable cask support, a tool holder having on its lower face a central bearing point to engage the cask head and position the holder thereon, arms adjustable in the holder in a plane substantially parallel to that of the rim, yielding means pressing the arms inwardly from the rim, tools pivoted to the arms to swing in a vertical plane, means normally pressing the holder against the cask end with its bearing point in engagement therewith, and means to elevate and fix the holder above the cask out of contact therewith.

4. In a cask rim planing machine, a rotatable cask support, a tool holder having upon its lower face a central bearing point to engage the cask head and position the holder thereon, arms adjustable in the holder in a plane substantially parallel to that of the rim, tools pivoted to the arms to swing in a vertical plane into and out of operative relation to the rim, yielding means pressing the arms and tools inwardly from the rim, a supporting spindle connected to the holder and guided for longitudinal adjustment axially of the cask, a weight pressing the spindle and tool holder downward, and means to elevate and fix the same above the cask end.

5. In a cask rim planing machine, a rotatable cask support, a tool holder having upon its lower face a central bearing point to engage the cask head and position the holder thereon, arms adjustable in the holder in a plane substantially parallel to that of the rim, tools pivoted to the arms to swing in a vertical plane into and out of operative relation to the rim, yielding means pressing the arms and tools inwardly from the rim, a spindle adjustably connected to the holder and provided with a rotatable joint, said spindle guided for longitudinal adjustment axially of the cask, a weight pressing the spindle and holder downward into contact with the cask head, and a lever connected with the spindle to elevate the same out of contact with the head.

6. In a cask rim planing machine, a rotatable cask support comprising a platform mounted upon a spindle and provided at its sides with guide sockets, a centering device surrounding the cask and carried by guide-rods sliding in the sockets, means to elevate the centering device out of engagement with the cask to release the same, a drive pulley, a friction coupling between the guide pulley and spindle, a weighted lever normally tending to disengage the coupling, a pedal acting upon said lever to engage the coupling, and a catch acting upon said pedal to hold the coupling in engagement, in combination with a weighted spindle guided for longitudinal adjustment above and in substantially axial relation to the cask, said spindle provided in its length with a rotatable coupling, a tool holder adjustably mounted on the lower end of the spindle, said holder having on its lower face a central bearing point to engage the cask head and position the holder centrally thereof, a lever connected with the spindle and out of contact with the cask head at will, arms slidable in the holder, springs pressing said arms inwardly from the rim, set screws arranged to fix the arms in said holder, knife holders pivoted to the arms to swing in a vertical plane, and means to adjust the angular position of the knife-holders relative to the arms comprising studs and set screws, and knives adjustable within the knife holders.

In testimony whereof I hereunto affix my signature in the presence of two witnesses.

LUDWIG DREXLER.

Witnesses:
ABRAHAM SCHLESINGER,
LOUIS F. MUELLER.